(12) United States Patent
Cho

(10) Patent No.: US 9,927,039 B2
(45) Date of Patent: Mar. 27, 2018

(54) CHECK-VALVE ASSEMBLY FOR VACUUM SYSTEM

(71) Applicant: VMECA CO., LTD, Seoul (KR)

(72) Inventor: Ho-Young Cho, Seoul (KR)

(73) Assignee: KOREA PNEUMATIC SYSTEM CO., LTD., Seoul (KR)

( * ) Notice: Subject to any disclaimer, the term of this patent is extended or adjusted under 35 U.S.C. 154(b) by 18 days.

(21) Appl. No.: 15/103,802

(22) PCT Filed: Mar. 11, 2015

(86) PCT No.: PCT/KR2015/002319
§ 371 (c)(1),
(2) Date: Jun. 10, 2016

(87) PCT Pub. No.: WO2015/141980
PCT Pub. Date: Sep. 24, 2015

(65) Prior Publication Data
US 2016/0305559 A1    Oct. 20, 2016

(30) Foreign Application Priority Data
Mar. 21, 2014  (KR) .................. 10-2014-0033125

(51) Int. Cl.
*F16K 15/14*   (2006.01)
*B65G 47/91*   (2006.01)

(52) U.S. Cl.
CPC ............ *F16K 15/148* (2013.01); *B65G 47/91* (2013.01)

(58) Field of Classification Search
CPC ...... F16K 15/148; F16K 15/202; B65G 47/91

USPC ....................................................... 137/854
See application file for complete search history.

(56) References Cited

U.S. PATENT DOCUMENTS

| | | | | |
|---|---|---|---|---|
| 274,308 A * | 3/1883 | George | ............... | F04B 39/0016 137/854 |
| 2,038,267 A * | 4/1936 | Bullard | ................. | F16K 15/148 128/201.19 |
| 2,225,395 A * | 12/1940 | Young | ................... | F16K 15/148 137/512.15 |

(Continued)

FOREIGN PATENT DOCUMENTS

JP     2006329096 A    12/2006
KR   20050101341 A    10/2005

(Continued)

OTHER PUBLICATIONS

International Search Report dated Jun. 11, 2015 from corresponding International PCT Application No. PCT/KR2015/002319, 5 pages.

*Primary Examiner* — Craig Schneider
*Assistant Examiner* — P. Macade Nichols
(74) *Attorney, Agent, or Firm* — Innovation Capital Law Group, LLP; Vic Lin

(57) ABSTRACT

Disclosed is a check-valve assembly for use in a vacuum system. The check-valve assembly of the present invention comprises a body having a plurality of through-holes formed therein while having different space characteristics. As a valve member rotates with a shaft fixed to the body, intake holes of the valve member selectively communicate with the through-holes. Accordingly, the check-valve assembly of the present invention can more quickly respond to vacuum characteristics required on site, which is advantageous.

10 Claims, 5 Drawing Sheets

(56) References Cited

U.S. PATENT DOCUMENTS

| | | | |
|---|---|---|---|
| 2,571,893 A * | 10/1951 | Kendall | H01M 2/1205 |
| | | | 137/854 |
| 2,948,296 A * | 8/1960 | Thorburn | F16K 17/34 |
| | | | 137/517 |
| 4,195,552 A | 4/1980 | Neff | |
| 4,196,882 A | 4/1980 | Rognon | |
| 4,197,875 A | 4/1980 | Schieferstein et al. | |
| 4,221,356 A | 9/1980 | Fortune | |
| 4,708,381 A | 11/1987 | Lundback | |
| 4,718,629 A | 1/1988 | Block et al. | |
| 5,048,804 A | 9/1991 | Ito | |
| 5,177,857 A | 1/1993 | Ito | |
| 5,181,691 A | 1/1993 | Taniguchi et al. | |
| 5,183,068 A | 2/1993 | Prosser | |
| 5,263,760 A | 11/1993 | Sohol | |
| 5,327,932 A | 7/1994 | Rozek | |
| 5,374,167 A | 12/1994 | Merbold | |
| 5,378,229 A | 1/1995 | Layer et al. | |
| 5,381,990 A | 1/1995 | Belokin et al. | |
| 5,451,086 A | 9/1995 | Pazzaglia | |
| 5,511,752 A | 4/1996 | Trethewey | |
| 5,518,027 A | 5/1996 | Saiki et al. | |
| 5,655,503 A | 8/1997 | Kampichler et al. | |
| 5,711,501 A | 1/1998 | Belokin et al. | |
| 5,950,670 A | 9/1999 | Flaim | |
| 5,992,806 A | 11/1999 | Adams | |
| 6,648,285 B1 | 11/2003 | Woollen | |
| 6,745,868 B2 | 6/2004 | Cheval | |
| 7,726,715 B2 | 6/2010 | Nagasawa et al. | |
| 2006/0070671 A1 | 4/2006 | Kasai et al. | |

FOREIGN PATENT DOCUMENTS

| | | |
|---|---|---|
| KR | 100793323 | 1/2008 |
| KR | 2020120004790 U | 7/2012 |

\* cited by examiner

CHECK-VALVE ASSEMBLY FOR VACUUM SYSTEM

TECHNICAL FIELD

The present invention relates generally to a check-valve assembly. More particularly, the present invention relates to a check-valve assembly for use in a vacuum transfer system in order to control air flow.

BACKGROUND ART

Referring to FIG. 1, a conventional vacuum system includes: a closed housing 1; an ejector 3 mounted to the housing 1, and exhausting air from an inner space S of the housing 1; and a suction pad 4 communicating with the inner space S via a communicating hole 2 provided at a side of the housing 1. In a state where a surface of an object P comes into close contact with the pad 4, when the compressed air is discharged through the ejector 3, the air in both the housing 1 and the suction pad 4 is suctioned to the ejector 3 and discharged along with the compressed air.

In the process mentioned above, a vacuum is generated within the housing 1, and at the same time, a negative pressure is generated within the pad 4, whereby it is possible to grip the object P by means of the generated negative pressure. Here, when the communicating hole 2 is too large, a degree of vacuum may decrease; on the contrary, when the communicating hole 2 is too small, a vacuum speed may be reduced. Thus, a valve element is required so as to regulate the communicating hole 2.

As an example of a conventional valve, a valve 5 shown in FIG. 2, as a flexible member having an intake hole 6 that is narrower than the communicating hole 2, is provided on a bottom surface of the communicating hole 2 of the housing 1, and is locked by a piece 7. When the same ejector 3 is used, the smaller the size of the intake hole 6 can be and thus the slower the vacuum speed will be. On the contrary, the larger the size of the intake hole, the faster the vacuum speed will be.

Meanwhile, as shown in FIG. 1, it is preferred that the intake holes 6 of valves 5a and 5b, which are not used to grip the object P, are as small as possible or closed. Further, in the case where the object P is permeable, it is favorable that the vacuum speed is high in comparison with a case where the object is impermeable, so the intake hole 6 with a bigger aperture is required. In view of the examples described above, depending on the properties of the object P (material, weight, size, etc.), an optimum aperture of the intake hole 6 of the valve 5 varies.

However, the valve 5, which is described above, has a single intake hole 6, and accordingly has a vacuum characteristic thereof, and thus it is impossible to quickly and flexibly respond to various optimum apertures depending on the properties of the object P. To solve this problem, Korean Patent No. 10-0793323 discloses "Check-valve assembly for vacuum system", which is invented by the inventor of the present invention.

FIG. 3 illustrates a valve assembly according to the related art mentioned above. The valve assembly 10 includes: a body 11 with a through-hole 12 at a side thereof; a shaft 13 rotatably mounted to the body 11; and a flexible valve 14 rotating along with the shaft by being locked to the shaft 13 and interfering with a lower portion of the through-hole 12. Here, the valve 14 is provided with a plurality of intake holes 15 and 16 having different sizes of apertures spaced apart from the shaft hole by a same radius of rotation.

In this structure, as the shaft 13 is rotated along with the valve 14, the through-hole 12 of the body 11 selectively communicates with one of the plurality of intake holes 15 and 16. In other words, the assembly 10 is advantageous in that the selection and change of the intake holes 15 and 16 of the valve are easy, and thus, it is possible to quickly respond to various optimum apertures depending on the properties of the object P.

However, in effect, in the valve assembly 10, the valve 14 is made of a thin and flexible rubber plate, so the valve assembly is disadvantageous in that deformation of the holes 15 and 16 may easily occur by exhaust pressure or vacuum pressure, and in the case where the hole is small, the holes may be clogged with particles, such as dust. Accordingly, it is impossible to design the hole to have various characteristics, such as the inner shape. Meanwhile, the valve is provided with a plurality of holes, whereby durability of the valve 14 decreases.

Consequently, the valve assembly 10 is not capable of regulating or controlling vacuum characteristics depending on the properties of the object P. In terms of structure, it is difficult to add the functional means for supplementing the control function above. Thus, the valve assembly 10 is rarely utilized on site.

DISCLOSURE

Technical Problem

Accordingly, the present invention has been made keeping in mind the above problems occurring in the related art, and the present invention is intended to propose a check valve assembly by improving "Check-valve assembly for vacuum system" disclosed by Korean Patent No. 10-0793323 mentioned above.

The present invention is intended to propose a check-valve assembly configured such that an intake hole of a valve selectively corresponds to a through-hole of a body, and is designed to quickly respond to a vacuum characteristic required on site, thereby improving on-site use. With respect to the purpose mentioned above, the inventor invented the present invention based on the point that a vacuum characteristic realized in a structure of the valve assembly 10 of FIG. 3 may be determined in effect by the through-hole 12 of the body 11, not by the intake holes 15 and 16 of the valve 14.

The present invention is further intended to propose a check-valve assembly configured such that through-holes are formed by using additional nozzles, whereby it is possible to widen the selection of the through-hole, thereby further improving on-site use.

Technical Solution

In order to achieve the above object, according to one aspect of the present invention, there is provided a check-valve assembly for a vacuum system including: a body including a shaft hole provided in a center thereof, with a plurality of mount holes having different space characteristics provided on the body at respective positions spaced apart from the shaft hole by a same radius of rotation; a shaft rotatably mounted to the body through the shaft hole; nozzles inserted into the mount holes and provided with vacuum through-holes therein; and a flexible valve facing a lower portion of the through-holes to interfere therewith, rotating along with the shaft by being locked to the shaft at a center thereof, and being formed with an intake hole on a side thereof to selectively communicate with one of the through-holes.

Preferably, the intake hole of the valve has a same or larger aperture than an aperture of a bigger through-hole of the through-holes so as not to create air flow resistance.

Advantageous Effects

According to a check-valve assembly of the present invention having the above-described characteristics, a valve member has a single intake hole, wherein the intake hole communicates with one of a plurality of through-holes. Herein, each of the through-holes is designed and manufactured to have different space characteristics, such as a length, an aperture, a shape, and the like, wherein the space characteristics are hardly changed by external forces. Thereby, the present invention is advantageous in that it is possible to quickly respond to the properties of an object, and it is possible to realize a vacuum characteristic required on site, thereby improving on-site use.

Further, the present invention is advantageous in that additional nozzles are used, and thus it is possible to acutely satisfy a desired vacuum condition, thereby improving on-site use.

BEST MODE

Figure 1:
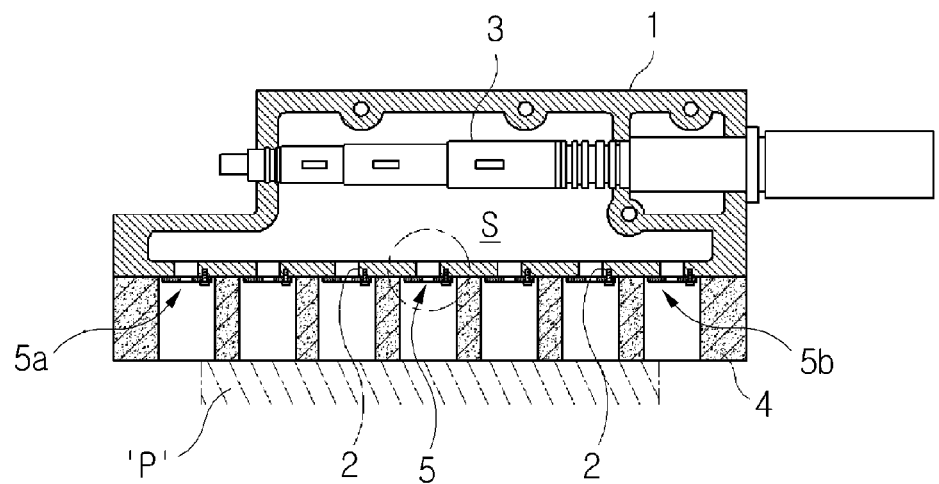
FIG. 1 is a view illustrating an example of a general vacuum system.
Figure 2:
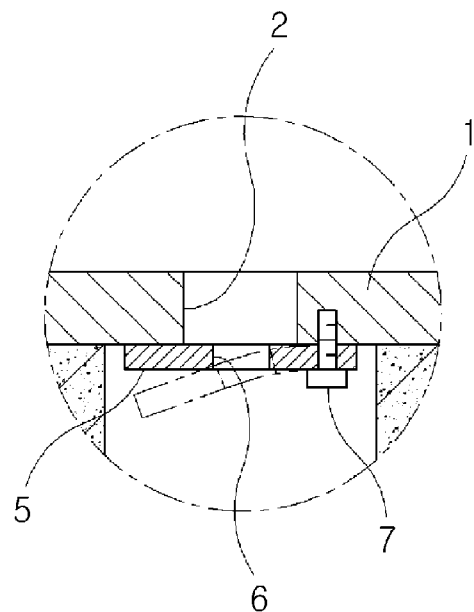
FIG. 2 is a view illustrating a configuration of a conventional valve.
Figure 3:
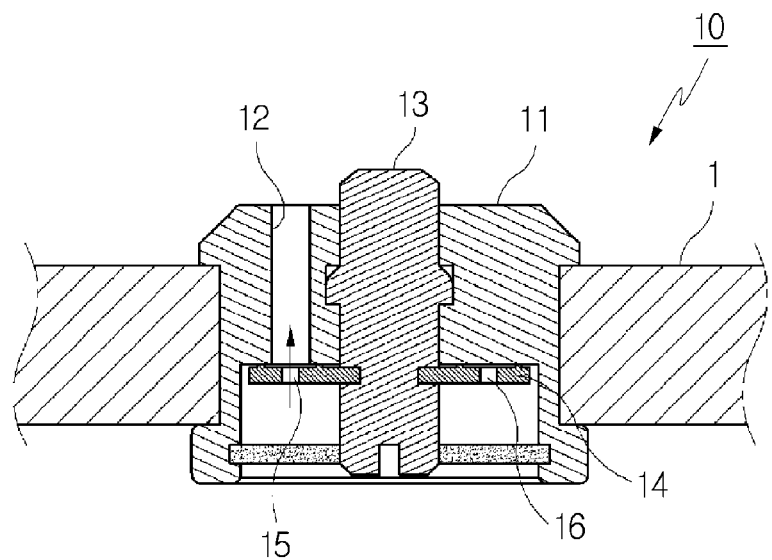
FIG. 3 is a view illustrating a configuration of a conventional valve assembly.

Reference will now be made in greater detail to an exemplary embodiment of the present invention, an example of which is illustrated in the accompanying drawings. The valve assembly according to the present invention is designated by reference numeral 100 in FIGS. 3 to 9.

Figure 4:
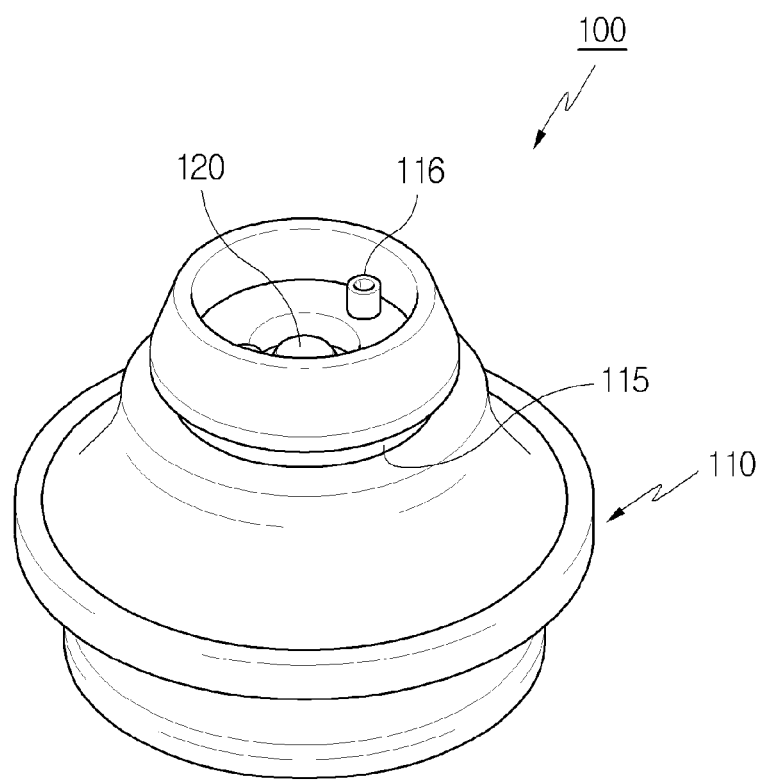
FIG. 4 is an outside view illustrating a check-valve assembly according to the present invention.
Figure 5:
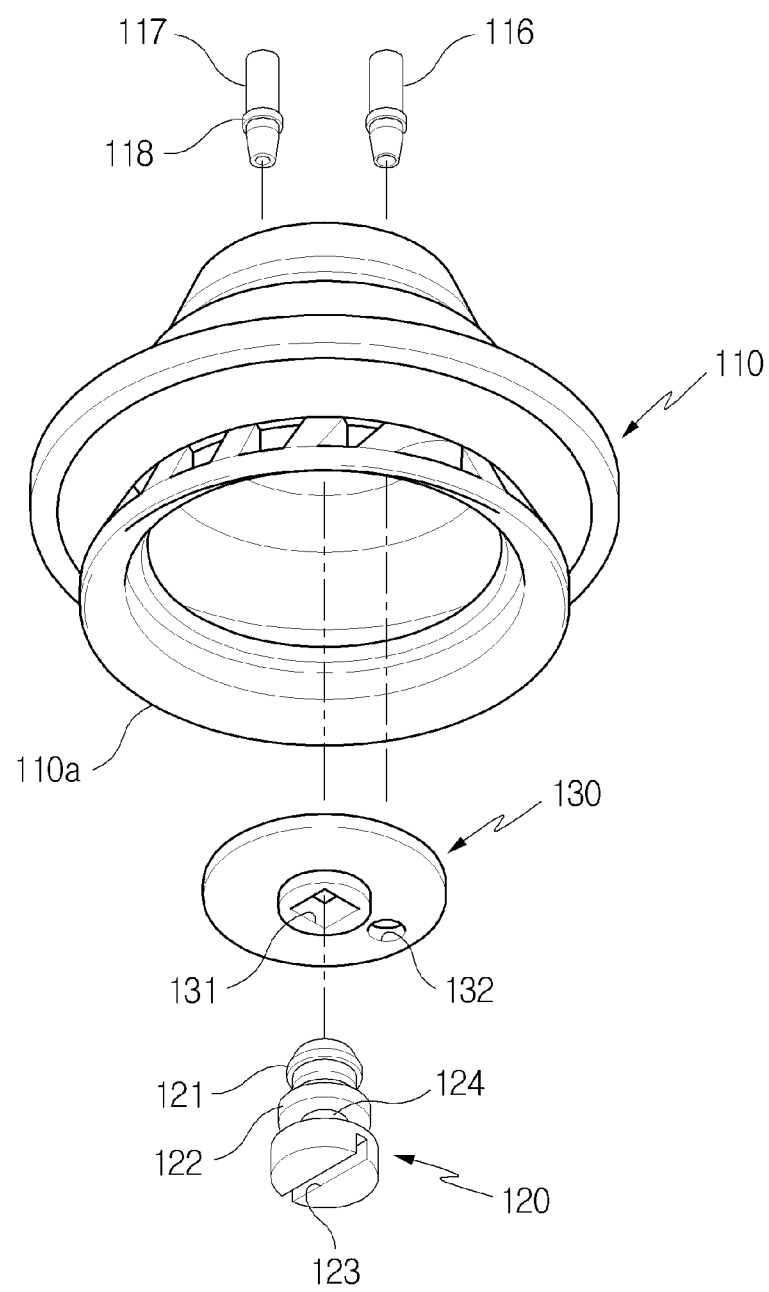
FIG. 5 is an exploded view of FIG. 4.
Figure 6:
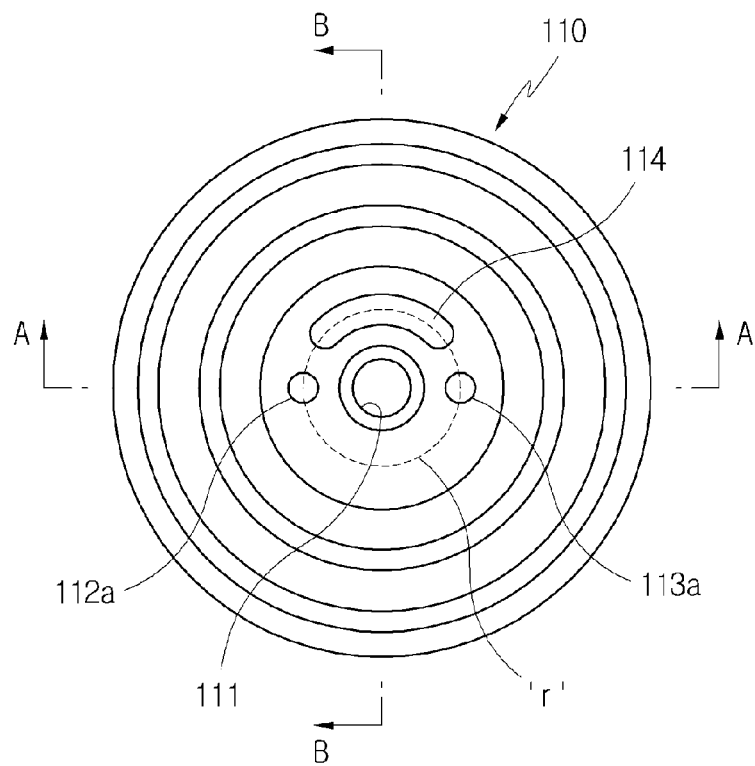
FIG. 6 is a bottom view illustrating a body of FIG. 5.
Figure 8:
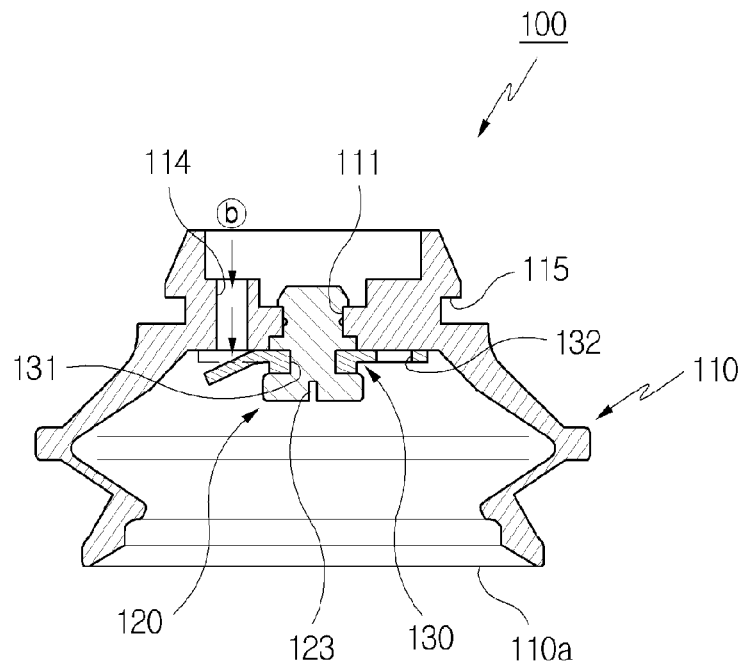
FIG. 8 is a sectional view taken along line B-B of FIG. 4.

Referring to FIGS. 4 and 8, the valve assembly 100 according to the present invention includes: a body 110 providing a base for allowing the valve to be mounted thereto; a shaft 120 rotatably mounted to the body; and a flexible valve 130 rotating along with the shaft 120 by being locked to the shaft.

The body 110 includes a shaft hole 111 provided in a center thereof, with a plurality of through-holes 112, 113, and 114 having different space characteristics provided on the body at respective positions spaced apart from the shaft hole by a same radius of rotation. Of course, the through-holes 112, 113, and 114 are holes for allowing air to flow in a vertical direction via the body 110, and the valve 130 is mounted to lower portions of the through-holes 112, 113, and 114 so as to interfere therewith to control air flow. Herein, reference numerals 112 and 113 denote the through-holes formed by nozzles 116 and 117 that are inserted into mount holes (designated by numerals 112a and 113a in FIG. 6) provided in the body.

In the embodiment, the body 110 is made of polyurethane, and has a little flexibility or elasticity, but is not limited thereto. For example, the body may be made of metal, such as aluminum, or hard plastic. Further, although the body 110 is separately provided and fixed to an exhaust housing (designated by reference numeral 1 in FIG. 1) in the embodiment described herein, the body may be integrally provided in a part of a bottom of the exhaust housing in other embodiments.

In the accompanying drawings, a lower portion 110a of the body 110 extends longer than lengths of both the shaft hole 111 and the through-holes 112, 113, and 114 so as to protect both the shaft 120 and the valve 130 locked thereto and to secure an operational space therefor. Meanwhile, the body 110 is formed with an insertion recess 115 on an outer surface thereof such that the body 110 is locked through the exhaust housing (designated by reference numeral 1 in FIG. 1).

As described hereinbefore, the body 110 is provided with a plurality of the through-holes 112, 113, and 114 having different space characteristics at respective positions spaced apart from the shaft hole 111 by the same radius of rotation r. Herein, the space characteristics collectively refer to a length, an area, an aperture, a shape, and the like of the hole as elements that determine a vacuum characteristic, such as a degree of vacuum and vacuum speed, etc., achieved in the valve assembly 100.

Meanwhile, in the accompanying drawings, of the through-holes, reference numerals 112 and 113 refer to vacuum-generation through-holes, and reference numeral 114 refers to a vacuum-break through-hole. Of course, the vacuum-generation through-holes 112 and 113 are always plural in number, and each thereof has a different space characteristic. In a state where the valve assembly 100 is normally operational, air passing through the vacuum-generation through-holes 112 and 113 flows in an arrow ⓐ direction in FIG. 7, and on the contrary, air passing through the vacuum-break through-hole 114 flows in an arrow ⓑ direction in FIG. 7. Reference will be made in detail to this air flow, hereinafter.

In the embodiment, the vacuum-generation through-holes 112 and 113 each have a space characteristic formed by the nozzles 116 and 117 respectively inserted into the holes. Thereby, the through-holes 112 and 113 can be selectively mounted to the holes, and thus, it is possible to quickly respond to vacuum characteristics required on site. Reference numeral 118 refers to a protrusion provided on an outer surface of the respective nozzles 116 and 117 so as to prevent the nozzles from being removed from the mount holes.

Figure 7:
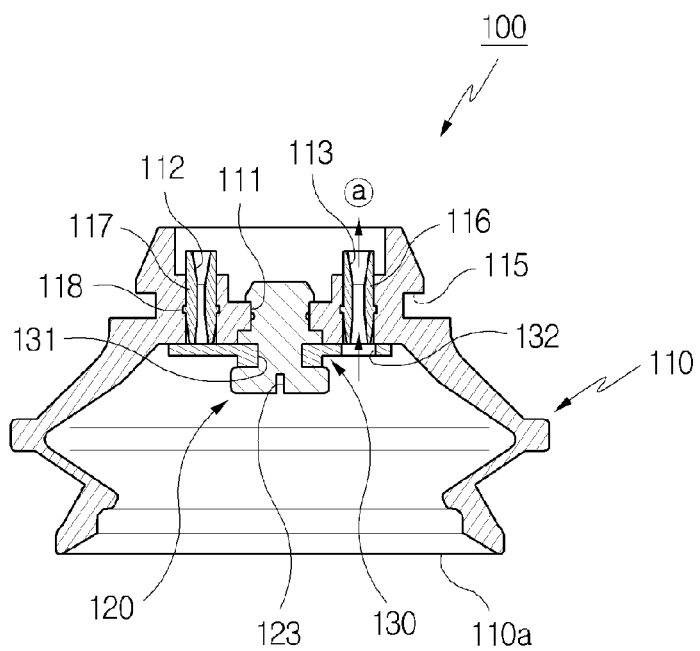
FIG. 7 is a sectional view taken along line A-A of FIG. 4.

As shown in FIG. 7, the through-holes 112 and 113, which are formed by the nozzles 116 and 117, are each configured such that opposite ends thereof, which define an inlet and an outlet, are wide and a path therebetween is narrow. This configuration is designed in consideration of air flow in the arrow direction, namely in consideration both the amount and speed of intake air during vacuum operation. Of course, the through-holes 112 and 113 are not limited to the shape mentioned above, so they may be designed into other shapes.

The shaft 120 is rotatably mounted to the body through the shaft hole 111 of the body 110. Here, the surface of the shaft 120 is provided with upper and lower stop protrusions 121 and 122 so as to prevent the shaft 120 from being removed from the shaft hole 111. The shaft 120 is provided with a control groove 123 at a lower portion thereof so as to allow rotation of the shaft 120 by using a tool.

Meanwhile, the shaft 120 is provided with a mount groove 124 on an outer circumferential surface thereof, wherein the valve 130 is locked to the mount groove 124 by being inserted into the mount groove at a center thereof. Preferably, the mount groove 124 is formed into a non-circular shape, particularly formed into a polygonal shape, and the valve 130 is formed with a hole corresponding to the mount groove, whereby the valve 130 fits into the mount groove 124.

The valve 130, as a flexible member that faces a lower portion of the through-holes 112, 113, and 114 to interfere therewith, rotates along with the shaft 120 by being locked to the shaft at a center thereof, and is formed with an intake hole 132 on a side thereof to selectively communicate with one of the through-holes 112, 113, and 114.

To be more specific, the valve 130 is made of flexible materials, such as rubber or silicon, and a polygonal-shaped center hole 131 thereof is inserted into the mount groove 124 of the shaft 120, which is correspondingly formed into a polygonal-shape, and locked thereto. Here, the valve 130 faces a lower portion of the through-holes 112, 113, and 114, and is disposed to come into close contact therewith. In this structure, when the shaft 120 is rotated, the valve 130 is rotated along therewith. Here, the intake hole 132 communicates with one of the vacuum-generation through-holes 112 and 113.

In the accompanying drawings, the intake hole 132 is an annular shape, but is not limited thereto as long as the intake holes communicates with one of the vacuum-generation through-holes. For example, the intake hole may be formed into a circular arc shape, a U-shape by cutting a portion of edge thereof, or the like.

According to a manner in which the valve 130 is rotated, the vacuum-break through-hole 114 may correspond to the intake hole 132. However, this corresponding relation therebetween is meaningless, so in reality, the communication relation therebetween may not occur. Thus, the vacuum-break through-hole 114 may be not required to be spaced apart from the shaft hole by the same radius of rotation as a plurality of the vacuum-generation through-holes 112 and 113.

One of the through-holes 112 and 113, which is selected by the rotation of the shaft 120 and the valve 130 so as to communicate with the valve, is opened by the valve 130. Then, the air in the lower portion of the body 110 passes through the opened through-hole of the through-holes 112 and 113 and moves upwards. Here, when the intake hole 132 has a smaller aperture than an aperture of the inlet of the facing through-hole 112 or 113, air flow is disturbed. Thus, the intake hole 132 of the valve 130 is configured to have a same or larger aperture than an aperture of a bigger through-hole of the through-holes 112 and 113.

The check-valve assembly 100 according to the present invention is mounted through the exhaust housing (see reference numeral 1 in FIG. 1). Further, the shaft 120 and the valve 130 are rotated such that the intake hole 132 of the valve 130 communicates with one of the vacuum-generation through-holes 112 and 113. Here, an operator can optimally select one of the through-holes 112 and 113 to match with the intake hole 132 by rotating the valve 130, while taking into account the properties of the object and the vacuum condition in accordance therewith.

For example, when the object is permeable and light, vacuum speed is required more than a degree of vacuum, so the through-hole 113 having a bigger aperture may be selected. On the contrary, when the object is impermeable and heavy, a degree of vacuum is required more than vacuum speed, so the through-hole 112 having a smaller aperture may be selected. If there is no optimum through-hole of the through-holes 112 and 113, the nozzles 116 and 117 may be changed.

Figure 9:
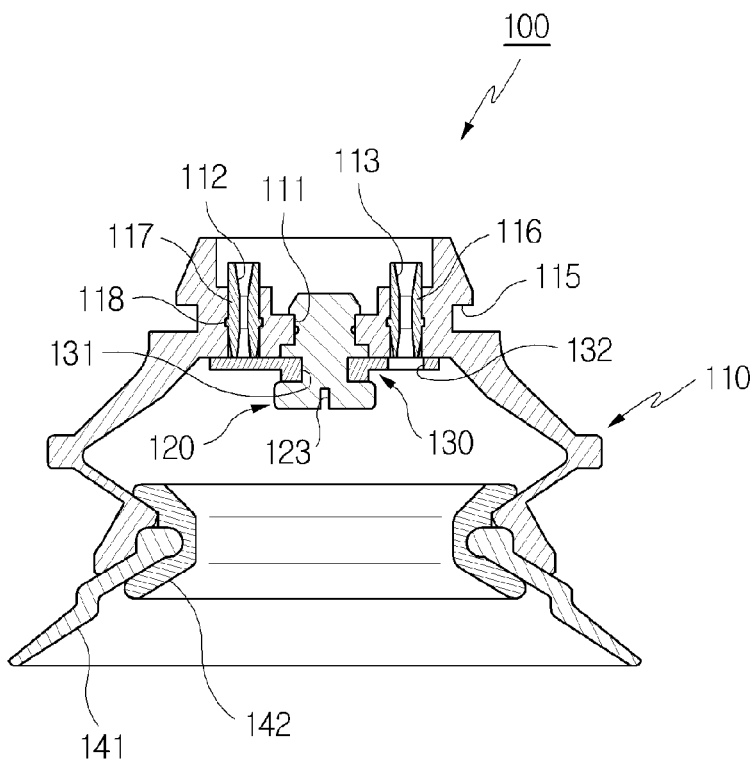
FIG. 9 is a view illustrating a state where the check-valve assembly of FIG. 4 is used.

Referring to FIG. 9, the body 110 may include a suction pad 141 connected to a lower portion thereof to be integrally formed into a vacuum-cup or a vacuum-pad. Herein, reference numeral 142 refers to a plastic connector that is provided inside the lower portion of the body 110 so as to detachably couple the suction pad 141 to the body. For example, the body 110 may further include a bellows provided at the lower portion 110a thereof by being connected to the lower portion 110a by using a connector 142, wherein the suction pad 141 is coupled to a lower portion of the bellows.

However, the connection structure where the connector 142 is used to connect the pad 141 is not particular to the present invention.

Referring to FIGS. 7 and 9, in a state where the intake hole 132 of the valve communicates with the through-hole 113, the ejector (see reference numeral 3 in FIG. 1) is used for generating compressed air that is flowed in and discharged at high speed so as to exhaust the inner space of the housing (see reference numeral 1 in FIG. 1), and at the same time, the air inside the pad 141 passes through the intake hole 132 and the through-hole 113, and is discharged along with the compressed air (see arrow (a)). Thereby, the negative pressure is generated inside the pad 141, and the object is gripped and transferred by the generated negative pressure.

Referring to FIG. 8, the compressed air may be directly provided to the inside of the pad 141. In other words, after transfer is finished in a manner that is described above, for the next work, the pad 141 is required to be quickly detached from the object. To achieve this, the compressed air is directly provided to the inside of the pad 141. Here, the compressed air is provided through the vacuum-break through-hole 114 (see arrow (b)), and the valve 130 is opened by the pressure of the compressed air, and the vacuum and the negative pressure inside the pad are broken, whereby the pad 141 is quickly detached from the object.

[Description of reference characters of important parts]

| | |
|---|---|
| 100: check-valve assembly | 110: body |
| 111: shaft hole | 112, 113, 114: through-holes |
| 115: insertion recess | 116, 117: nozzles |
| 118: protrusion | 120: shaft |
| 121, 122: stop protrusions | 123: control groove |
| 124: mount groove | 130: valve |
| 131: center hole | 132: intake hole |
| 141: pad | 142: connector |

The invention claimed is:

1. A check-valve assembly for a vacuum system, the check-valve assembly comprising:
  a body (110) including a shaft hole (111) provided in a center thereof, with a plurality of mount holes (112a and 113a) having different space locations provided on the body at respective positions spaced apart from the shaft hole by a same radius of rotation;
  a shaft (120) rotatably mounted to the body through the shaft hole;

nozzles (116 and 117) inserted into the mount holes (112*a* and 113*a*) and provided with vacuum through-holes (112 and 113) therein; and a flexible valve (130) facing a lower portion of the through-holes (112 and 113) to interfere therewith, rotating along with the shaft (120) by being locked to the shaft at a center thereof, and being formed with an intake hole (132) on a side thereof to selectively communicate with one of the through-holes (112 and 113).

2. The check-valve assembly of claim 1, wherein the intake hole (132) has a same or larger aperture than an aperture of a bigger through-hole of the through-holes (112 and 113).

3. The check-valve assembly of claim 1, wherein the body (110) further includes a vacuum-break through-hole (114).

4. The check-valve assembly of claim 1, wherein the body (110) is configured such that an outer circumferential edge of a lower portion (110*a*) thereof extends longer than lengths of both the shaft hole (111) and the through-holes (112 and 113).

5. The check-valve assembly of claim 1, wherein the nozzles (116 and 117) include the through-holes (112 and 113) each configured such that opposite ends thereof, which define an inlet and an outlet, are wide and a path therebetween is narrow.

6. The check-valve assembly of claim 1, wherein the nozzles (116 and 117) each include a protrusion (118) provided on an outer surface thereof so as to prevent the nozzles (116 and 117) from being removed from the mount holes.

7. The check-valve assembly of claim 1, wherein the shaft (120) is provided with a control groove (123) at a lower portion thereof so as to allow rotation of the shaft (120) by using a tool.

8. The check-valve assembly of claim 4, wherein the body (110) includes a suction pad (141) connected to or formed at a lower portion (110*a*) thereof to be integrally formed into a vacuum-cup or a vacuum-pad.

9. The check-valve assembly of claim 8, wherein the body (110) includes a connector (142) provided inside the lower portion (110*a*) thereof so as to detachably couple the suction pad (141) to the body (110).

10. The check-valve assembly of claim 9, wherein the body (110) further includes a bellows provided at the lower portion (110*a*) thereof by being connected to the lower portion (110*a*) by using a connector (142), wherein the suction pad (141) is coupled to a lower portion of the bellows.

* * * * *